United States Patent
Hiraoka et al.

(10) Patent No.: US 9,112,736 B2
(45) Date of Patent: Aug. 18, 2015

(54) DATA TRANSFER APPARATUS, DATA TRANSFER METHOD, AND INTER-CHIP COMMUNICATION SYSTEM

(71) Applicant: CANON KABUSHIKI KAISHA, Tokyo (JP)

(72) Inventors: Takeshi Hiraoka, Tokyo (JP); Daisuke Shiraishi, Tokyo (JP); Akiyoshi Momoi, Bangalore (IN); Chuma Nagao, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 92 days.

(21) Appl. No.: 13/714,019

(22) Filed: Dec. 13, 2012

(65) Prior Publication Data
US 2013/0156050 A1 Jun. 20, 2013

(30) Foreign Application Priority Data
Dec. 20, 2011 (WO) .................. PCT/JP2011/079499

(51) Int. Cl.
H04J 3/24 (2006.01)
H04L 29/02 (2006.01)
G06F 13/40 (2006.01)

(52) U.S. Cl.
CPC ............ H04L 29/02 (2013.01); G06F 13/4045 (2013.01)

(58) Field of Classification Search
None
See application file for complete search history.

(56) References Cited

U.S. PATENT DOCUMENTS

| | | | | |
|---|---|---|---|---|
| 8,065,437 | B2* | 11/2011 | Le Pennec et al. | 709/247 |
| 2006/0106940 | A1* | 5/2006 | Jagannathan et al. | 709/238 |
| 2006/0253618 | A1* | 11/2006 | Frouin et al. | 710/8 |
| 2010/0054238 | A1* | 3/2010 | Shiota et al. | 370/352 |
| 2011/0026403 | A1* | 2/2011 | Shao et al. | 370/235 |
| 2011/0149848 | A1* | 6/2011 | Ho et al. | 370/328 |
| 2012/0117286 | A1* | 5/2012 | Yun et al. | 710/110 |

FOREIGN PATENT DOCUMENTS

| | | |
|---|---|---|
| JP | 2001-111546 A | 4/2001 |
| JP | 2004-246694 A | 9/2004 |
| JP | 2004-364317 A | 12/2004 |
| JP | 2008-205942 A | 9/2008 |
| JP | 2009-130677 A | 6/2009 |
| JP | 2009-135974 A | 6/2009 |

* cited by examiner

Primary Examiner — Edan Orgad
Assistant Examiner — Rebecca Song
(74) Attorney, Agent, or Firm — Canon U.S.A. Inc., IP Division (57) ABSTRACT

Transfer efficiency of data transfer in a single semiconductor device or between semiconductor devices is improved. A table is created by associating a combination of attribute information involved in data transfer with an identifier. When attribute information registered in the table is received, the attribute information is replaced with an identifier so that the information is compressed and transferred. Accordingly, transfer efficiency is increased in transmission or reception of a request and a response.

16 Claims, 8 Drawing Sheets

| | | READ ADDRESS CHANNEL | READ DATA CHANNEL | WRITE ADDRESS CHANNEL | WRITE DATA CHANNEL | WRITE RESPONSE CHANNEL |
|---|---|---|---|---|---|---|
| CLOCK | ACLK | | | | | |
| RESET | ARESETn | | | | | |
| CHANNEL NAME | | READ ADDRESS CHANNEL | READ DATA CHANNEL | WRITE ADDRESS CHANNEL | WRITE DATA CHANNEL | WRITE RESPONSE CHANNEL |
| HANDSHAKE SIGNAL | | ARREADY<br>ARVALID | RREADY<br>RVALID | AWREADY<br>AWVALID | WREADY<br>WVALID | BREADY<br>BVALID |
| TRANSFER INFORMATION | | ARADDRESS[31:0] | RDATA[31:0]<br>RRESP[1:0] | AWADDRESS[31:0] | WDATA[31:0]<br>WSTRB[1:0] | BRESP[1:0] |
| ID | | ARID[3:0] | RID[3:0] | AWID[3:0] | WID[3:0] | BID[3:0] |
| TRANSFER ATTRIBUTE | | ARBURST[1:0]<br>ARLEN[3:0]<br>ARLOCK[1:0]<br>ARCACHE[3:0]<br>ARPROT[2:0]<br>ARSIZE[2:0]<br>ARQOS[3:0] | RLAST | AWBURST[1:0]<br>AWLEN[3:0]<br>AWLOCK[1:0]<br>AWCACHE[3:0]<br>AWPROT[2:0]<br>AWSIZE[2:0]<br>AWQOS[3:0] | WLAST | |
| TRANSFER ATTRIBUTE ADDED IN AXI4 | | ARLEN[7:4]<br>ARREGION[3:0]<br>ARUSER[x:0] | RUSER[x:0] | AWLEN[7:4]<br>AWREGION[3:0]<br>AWUSER[x:0] | WUSER[x:0] | BUSER[x:0] |

FIG. 3

| CATEGORY | CLOCK | RESET | REQUEST | RESPONSE | DATA HANDSHAKE | SIDE BAND |
|---|---|---|---|---|---|---|
|  | CLK | MReset_n, SReset_n |  |  |  |  |
| OCP1.0 BASIC |  |  | MCmd[2:0]<br>MAddr[x:0]<br>SCmdAccept | SData[x:0]<br>SResp[1:0]<br>MRespAccept | MData[x:0]<br>MDataValid<br>SDataAccept |  |
| OCP1.0 EXTENSION |  |  | MByteEn[dwidth/-81:0]<br>MThreadID[x:0]<br>MConnID[x:0]<br>MAddrSpace[x:0] | SThreadID[x:0] | MDataByteEn[dwidth/-81:0]<br>MDataThreadID[x:0] |  |
| OCP2.0 EXTENSION |  |  | MBurstSeq[2:0]<br>MBurstLength[x:0]<br>MBurstPrecise<br>MBurstSingleReq<br>MAtomicLength[x:0]<br>MReqLast | SRespLast | MDataLast | MThreadBusy<br>SThreadBusy<br>SDataThreadBusy |
|  |  |  | MReqInfo[x:0] | SDataInfo[x:0]<br>SRespInfo[x:0] | MDataInfo[x:0] |  |
| OCP2.1 EXTENSION |  |  | MTagID[x:0]<br>MTagInOrder | STagID[x:0]<br>STagInOrder | MDataTagID[x:0] |  |
| OCP2.2 EXTENSION |  |  | MBlockHeight[x:0]<br>MBlockStride[x:0]<br>MReqRowLast | MRespRowLast | MDataRowLast |  |
|  |  |  | Msecure<br>(included in MReqInfo) |  |  | EnableClk |
| OCP3.0 EXTENSION |  |  | MCohCmd |  |  | Mconnect[1:0]<br>Sconnect<br>SWait |

FIG. 4

| | LOCK[1:0] | CACHE[3:0] | PORT[2:0] | SIZE[2:0] | BURST[1:0] | ID[3:0] | Type[4] | Type[1:0] |
|---|---|---|---|---|---|---|---|---|
| COMBINATION 1 | 0 0 | 0 0 0 0 | 0 0 0 | 0 1 1 | 0 0 | 0 0 0 0 | 1 | 0 0 |
| COMBINATION 2 | 0 0 | 0 0 0 0 | 0 0 0 | 0 1 1 | 0 1 | 0 0 0 0 | 1 | 0 1 |
| COMBINATION 3 | 0 0 | 0 0 0 0 | 0 0 1 | 0 1 1 | 0 1 | 0 0 0 1 | 1 | 1 0 |
| COMBINATION 4 | 0 0 | 0 0 0 0 | 0 0 0 | 0 1 1 | 1 0 | 0 1 1 0 | 1 | 1 1 |
| DEFAULT | DATA WHICH DOES NOT MATCH ONE OF ABOVE-DESCRIBED PATTERNS | | | | | | 0 | 0 0 |

FIG. 5

| Type[4:0] | DESCRIPTION OF PACKET |
|---|---|
| 00000 | Read Request WITH TRANSFER ATTRIBUTE INFORMATION |
| 100XX | Read Request WHOSE TRANSFER ATTRIBUTE INFORMATION MATCHES TABLE XX |
| 01000 | Write Request WITH TRANSFER ATTRIBUTE INFORMATION |
| 110XX | Write Request WHOSE TRANSFER ATTRIBUTE INFORMATION MATCHES TABLE XX |
| 00100 | Read Response WITH TRANSFER ATTRIBUTE INFORMATION |
| 101YY | Read Response WHOSE TRANSFER ATTRIBUTE INFORMATION MATCHES TABLE YY |
| 01100 | Write Response WITH TRANSFER ATTRIBUTE INFORMATION |
| 111YY | Write Response WHOSE TRANSFER ATTRIBUTE INFORMATION MATCHES TABLE YY |

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| PACKET IDENTIFIER | | | | Type | LOCK | | CACHE | | | | PORT | | | BURST | |
| SIZE | | | ID | | | RESERVE AREA | | | | | | | | | |
| ADDRESS 0 | | | | | | | | | | | | | | | |
| ADDRESS 1 | | | | | | | | | | | | | | | |
| DATA 0 | | | | | | | | | | | | | | | |
| DATA 1 | | | | | | | | | | | | | | | |

FIG. 8B

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| PACKET IDENTIFIER | | | | Type | RESERVE AREA | | | | | | | | | | |
| ADDRESS 0 | | | | | | | | | | | | | | | |
| ADDRESS 1 | | | | | | | | | | | | | | | |
| DATA 0 | | | | | | | | | | | | | | | |
| DATA 1 | | | | | | | | | | | | | | | |

FIG. 9

DATA TRANSFER APPARATUS, DATA TRANSFER METHOD, AND INTER-CHIP COMMUNICATION SYSTEM

TECHNICAL FIELD

The present invention relates to a speed-enhancement technology for data transfer in an integrated circuit and data transfer between integrated circuits.

BACKGROUND ART

Recently, data volume to be processed in an integrated circuit has increased. Therefore, a technology which increases efficiency of data transfer between blocks in an integrated circuit or between integrated circuits is desired. On the other hand, to enhance a data transfer function itself, various types of attribute information are transferred in addition to an address and data that are to be transferred.

To improve transfer efficiency, in Japanese Laid-Open Patent Application No. 2004-246694 (hereinafter referred to as "PTL 1"), a method is disclosed in which data transferred through a bus is compressed on a several bits basis. In Japanese Laid-Open Patent Application No. 2008-205942 (hereinafter referred to as "PTL 2"), a method is disclosed in which an address is compressed. In Japanese Laid-Open Patent Application No. 2009-135974 (hereinafter referred to as "PTL 3"), a method is disclosed in which a header including an address is compressed in a simple manner.

In the methods in PTLs 1 to 3, compression is achieved by utilizing redundancy. Accordingly, when randomness in values of transfer data or transfer addresses increases, the compression efficiency obtained by simply compressing addresses or headers is not good.

SUMMARY OF INVENTION

A data transfer apparatus of the present invention performs data transfer using a packet having a header field and a data field including data. The header field includes multiple pieces of attribute information that indicate types of the data transfer. The apparatus includes storing means, receiving means, and transmitting means. The storing means stores pairs of a combination of attribute information and an identifier that are associated with each other. The combinations of attribute information indicate types of the data transfer that are used in a first bus. The receiving means receives a packet including multiple pieces of attribute information from the first bus. In the case where the multiple pieces of attribute information included in the packet received by the receiving means match a certain combination of attribute information stored in the storing means, the transmitting means transmits a packet including the identifier corresponding to the certain combination of attribute information instead of the multiple pieces of attribute information.

Further features of the present invention will become apparent from the following description of exemplary embodiments with reference to the attached drawings.

DESCRIPTION OF EMBODIMENTS

First Embodiment

Figure 9:
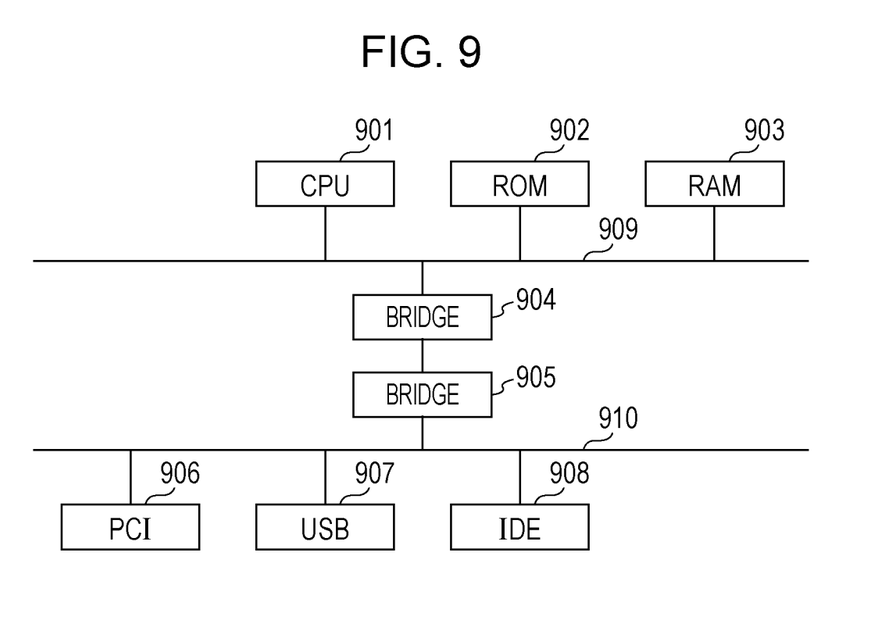
FIG. 9 is a schematic diagram illustrating the configuration of an inter-chip communication system.

A first embodiment of the present invention will be described in detail below with reference to the drawings. FIG. 9 illustrates the exemplary configuration of an inter-chip communication system including data transfer apparatuses according to the first embodiment of the present invention. A CPU 901, a ROM 902, and a RAM 903 are connected to a first bus 909, while a PCI 906, a USB 907, and an IDE 908 are connected to a second bus 910. The first bus 909 and the second bus 910 are connected to each other via bridges 904 and 905. This configuration is a typical configuration of a two-chip set in a general-purpose computer, and includes a chip including the bridge 904 and a chip including the bridge 905.

The CPU 901 develops programs stored in the ROM 902 into the RAM 903, and reads the programs from the RAM 903 and executes them. The PCI 906, the USB 907, and the IDE 908, which are connected to the second bus 910, are controllers which control connection with various peripheral devices (not illustrated).

The bridge 904 transfers a data transfer request (such as a read request, or a write request) transmitted in accordance with the protocol of the first bus 909 by the CPU 901 or a DMAC (not illustrated), to the bridge 905 through inter-chip connection. A write request contains, for example, data stored in the RAM 903 or a value in a register (not illustrated). The bridge 905 transfers data obtained from the bridge 904, in accordance with the protocol of the second bus 910 to various peripheral circuits. A data transfer request includes attribute information indicating the types of the data transport system (the burst length, the exclusive attribute, the security information, and information whether or not a cache is used) used in transfer of data to be transferred. For example, data (at the time of response) which is read out in a read access from the CPU 901 or the DMAC (not illustrated) to the PCI 906, the USB 907, and the IDE 908 and data which is to be written in a write access are transferred with the types of data transfer indicated by the attribute information.

The response to a request (such as read data or a request completion notification) is transmitted from the request destination to the request sender. In this case, the response is transmitted through the bridges 905 and 904, and is subjected to the protocol conversion which is an inversion of that used for the request; accordingly this inversion will not be described in detail.

The configuration of the inter-chip communication system including data transfer apparatuses according to the first embodiment is not limited to that in FIG. 9, and a wide application may be deployed to a packet transmitted/received to/from an integrated circuit.

Figure 1:
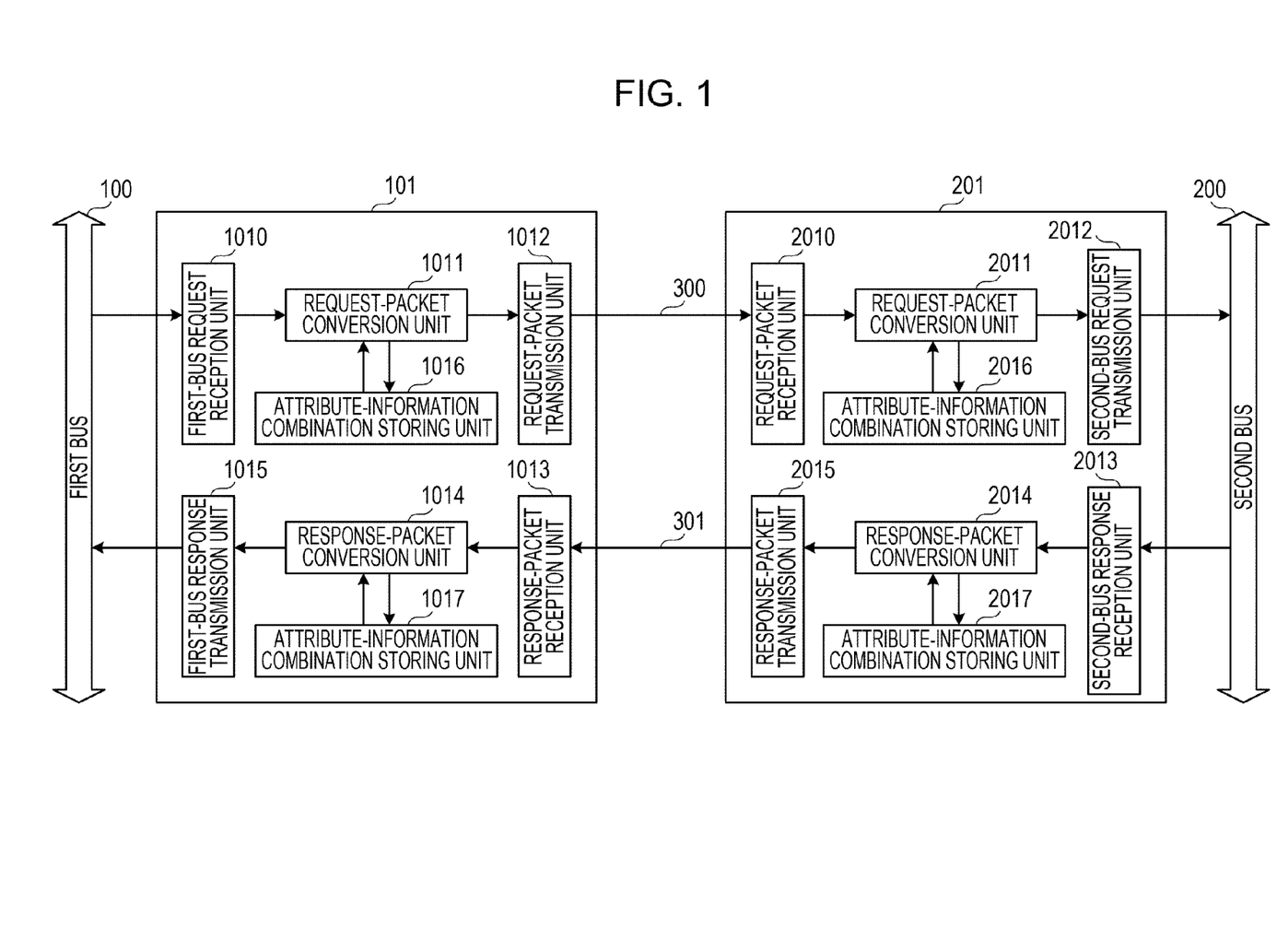
FIG. 1 is a schematic diagram illustrating the configuration of a data transfer apparatus.
Figure 8A:
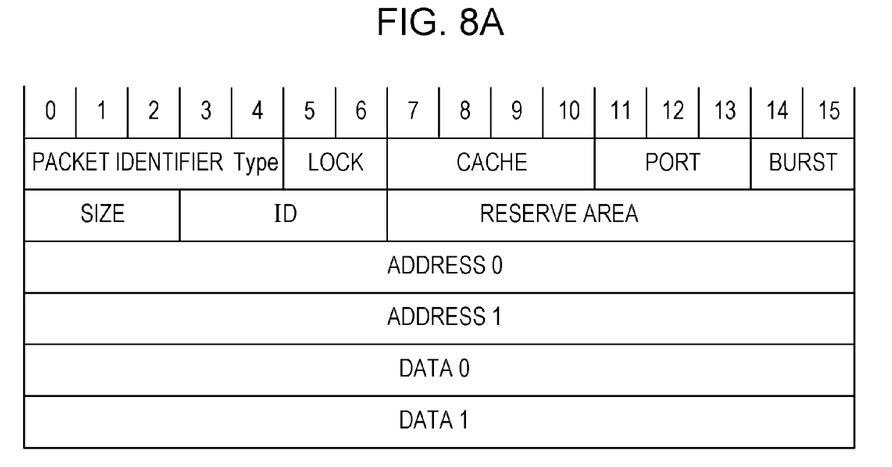
FIG. 8A illustrates an exemplary packet format used when a value in an attribute information storing unit is not matched.
Figure 8B:
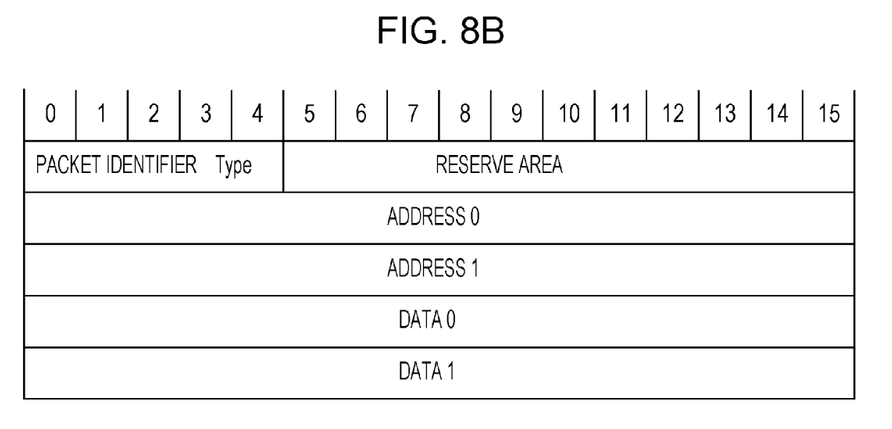
FIG. 8B is a diagram illustrating an exemplary packet format used when a value in an attribute information storing unit is matched.

FIG. 1 is a diagram illustrating a detailed configuration of the data transfer apparatus (the bridges 904 and 905). When data is transferred from a first bus 100 to a second bus 200 which are illustrated in FIG. 1, a data transmitting apparatus 101 and a data receiving apparatus 201 perform packet transfer. Referring to FIG. 1, an overview of the configuration of the data transfer apparatus will be described. As illustrated in FIGS. 8A and 8B, a packet used in the transfer includes a header field including a packet identifier (from 0th to 4th bit), transfer attribute information (from 5th to 15th bit), and an address, and a data field including data to be transferred. Each field is segmented into transfer units each having a predetermined length (characters).

The data transmitting apparatus 101 serving as a first integrated circuit corresponding to the bridge 904 in FIG. 9 is connected to the first bus 100 and third buses 300 and 301. The data transmitting apparatus 101 includes therein a first-bus request reception unit 1010 (first reception unit), a first-bus/third-bus request-packet conversion unit 1011, a transmission-request attribute-information storing unit 1016 (first storing unit), and a request-packet transmission unit 1012 (first transmission unit), which perform a request process.

A request transmitted from the first bus 100 includes a destination address (ADDRESS), a flag indicating whether the request is for write transfer or for read transfer, write data (WDATA), a strobe (WSTRB), and attribute information indicating the transfer type of the request or a response (or a packet).

The first-bus request reception unit 1010 extracts an address, data, a strobe, and attribute information from the above-described request in accordance with signals which control request timing, and transmits them to the request-packet conversion unit 1011. Signals which control request timing are a valid signal (Request signal) and a valid signal (Valid signal) which are received from the first bus 100 by the first-bus request reception unit 1010, and a ready signal (Ready signal) and an accept signal (Accept signal) which are output by the first-bus request reception unit 1010 in accordance with the Request signal or the Valid signal. The first-bus request reception unit 1010 performs a handshake with the request sender through these signals, and then performs a packet reception procedure.

The attribute-information combination storing unit 1016 has a register and a memory which store combinations of attribute information which are associated with a transfer request, or constant values. The request-packet conversion unit 1011 converts a request from the first bus into a packet to be used in the third bus. At that time, the request-packet conversion unit 1011 accesses the attribute-information combination storing unit 1016 and refers to its contents, and compresses the attribute information if possible. More details about this will be described below.

The request-packet transmission unit 1012 is connected to the third bus 300, and transmits a packet received from the request-packet conversion unit 1011, to the third bus 300.

The data transmitting apparatus 101 further includes a response-packet reception unit 1013, a response-packet conversion unit 1014, an attribute-information combination storing unit 1017, and a first-bus response transmission unit 1015. In this configuration, a packet received from the third bus is converted into a packet in the first-bus format which is output. This configuration will not be described in detail because it is similar to the configuration in which the data transmitting apparatus 101 converts a packet received from the first bus into a packet in the third-bus format.

The data receiving apparatus 201 serving as a second integrated circuit corresponding to the bridge 905 in FIG. 9 is connected to the second bus 200 and the third buses 300 and 301. The data receiving apparatus 201 includes a request-packet reception unit 2010 (second reception unit), a request-packet conversion unit 2011, an attribute-information combination storing unit 2016 (second storing unit), and a second-bus request transmission unit 2012 (second transmission unit).

The request-packet reception unit 2010 is connected to the third bus 300, and transmits a packet received from the data transmitting apparatus 101, to the request-packet conversion unit 2011. The attribute-information combination storing unit 2016 has a register and a memory which store combinations of attribute information which are associated with a transfer request, or constant values.

A packet which is output as a request by the data receiving apparatus 201 to the second bus 200 includes a destination address (ADDRESS), a flag indicating whether the packet is for write transfer or for read transfer, write data (WDATA), a strobe (WSTRB), and attribute information indicating the data transfer type. The request-packet conversion unit 2011 converts a packet from the third bus into a request for the second bus. At that time, the request-packet conversion unit 2011 accesses the attribute-information combination storing unit 2016.

The second-bus request transmission unit 2012 transmits the request information received from the request-packet conversion unit 2011, to the second bus 200 in accordance with signals which control request timing. Signals which control request timing are a Ready signal and an Accept signal which are output by the request destination in accordance with a Request signal and a Valid signal which are output from the second-bus request transmission unit 2012. The second-bus request transmission unit 2012 performs a handshake with the request destination through these signals, and then starts transfer of a request.

The data receiving apparatus 201 further includes a second-bus response reception unit 2013, a response-packet conversion unit 2014, an attribute-information combination storing unit 2017, and a response-packet transmission unit 2015 which perform a response process. In this configuration, a packet received from the second bus is converted into a packet in the third-bus format which is output. This configuration will not be described in detail because it is similar to the configuration in which the data transmitting apparatus 101 converts a packet received from the first bus into a packet in the third-bus format.

The AXI and OCP protocols will be briefly described as an exemplary standard protocol used in the first bus 100 and the second bus 200 in FIG. 1, or the buses 909 and 910 in FIG. 9. These bus protocols define parallel communication of pieces of data "attribute information", "address", and "data" according to a certain format.

Figure 2:
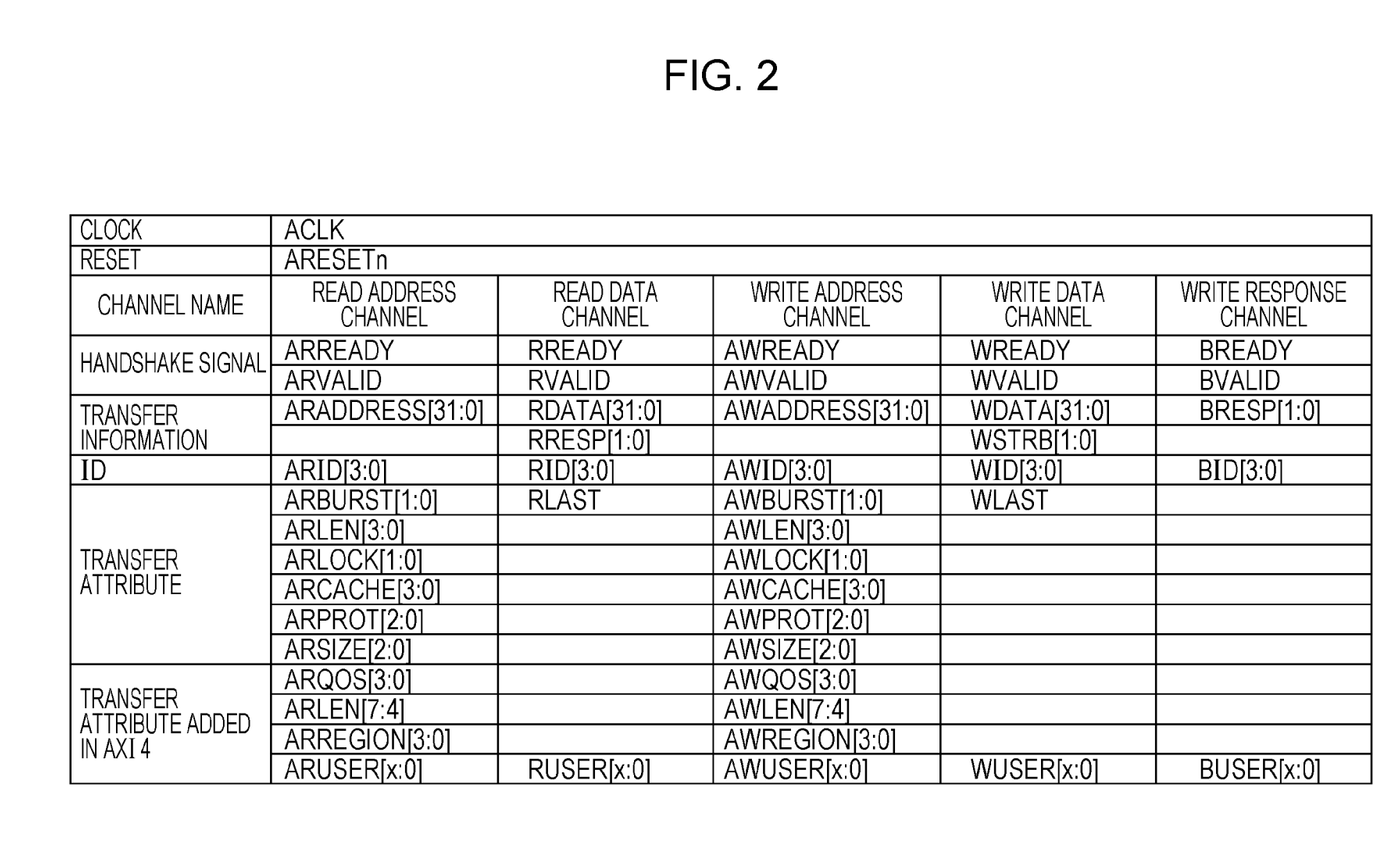
FIG. 2 is a diagram illustrating the AXI bus protocol.

FIG. 2 illustrates control signals and address/data/attribute information for a bus according to AXI (Advanced eXtensible Interface) which is a bus protocol used in an integrated circuit.

The AXI bus protocol has five transfer paths called channels. The channels are a read address channel which conveys a read address, a write address channel which conveys a write address, a read data channel which conveys a response or data for read, a write data channel which conveys data for write, and a write response channel which conveys a response for write. Each channel performs a handshake through Valid and Ready signals which control communication and timing for transfer, and performs a sequence of transfer processes. For each channel, in addition to an address and data which are basic information of data transfer, an xBURST signal indicating the transfer type, an xLEN signal indicating the transfer length, an xLOC signal indicating atomic transfer, an xCACHE signal indicating cache control information, an xPORT signal indicating security information of transfer, an xSIZE signal indicating the data width size of transfer, an xQOS signal indicating transfer priority, an xBURST signal indicating a transfer area segment, and an xUSER signal conveying any user information are defined as attribute information of transfer.

Figure 3:
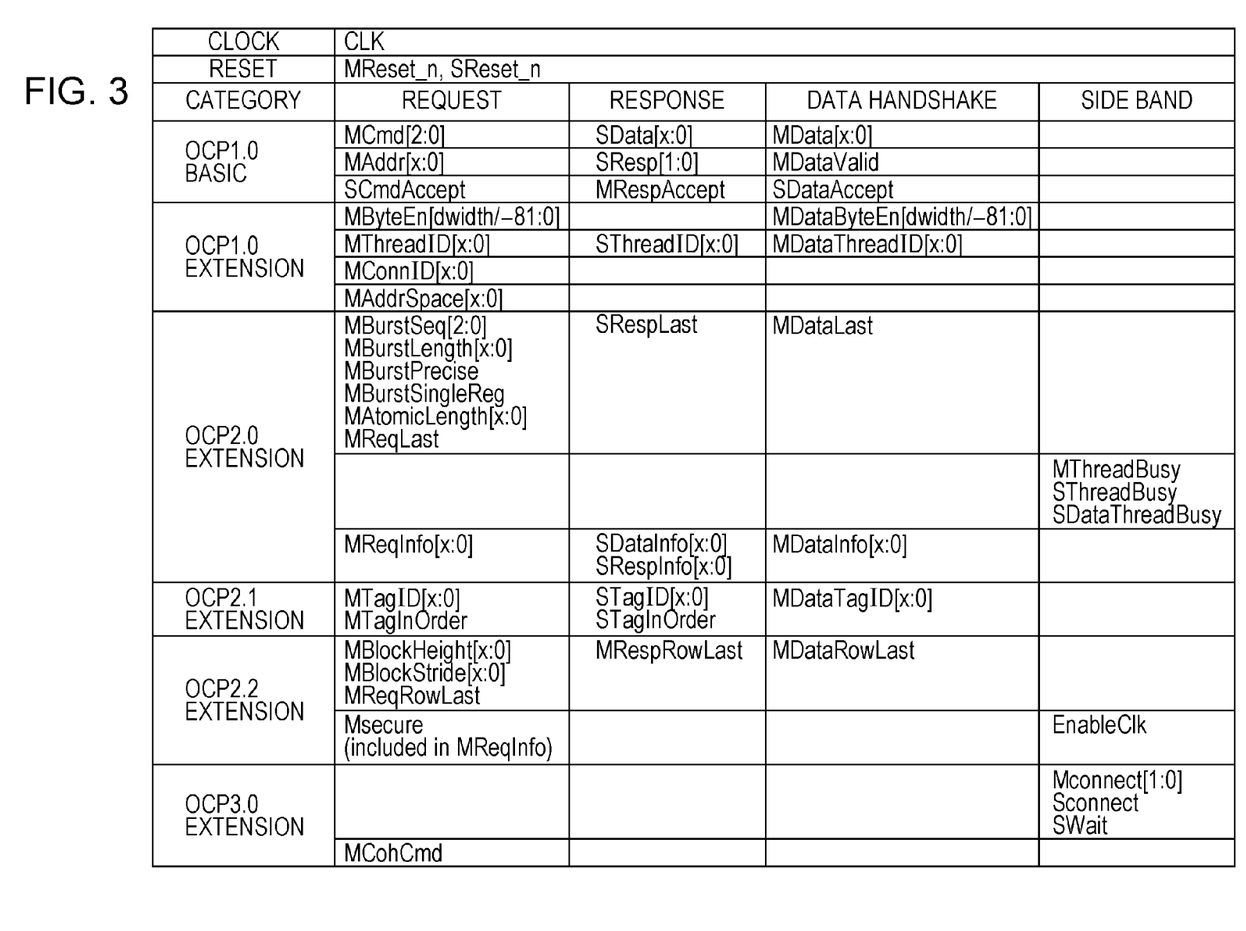
FIG. 3 is a diagram illustrating the OCP bus protocol.

FIG. 3 illustrates control signals and address/data/attribute information for a bus according to OCP (OpenCore Protocol) which is a bus protocol used in an integrated circuit.

The OCP bus protocol has four transfer paths, and is constituted by a request transfer path which conveys request information and an address, a response transfer path which conveys a write response and read data/response, a data handshake transfer path which conveys write data, and the other transfer path. In each transfer path, a handshake is performed through pairs of Mcmd/SCmdAccept signals, SResp/MRespAccept signals, and MdataValid/SDataAccept signals, and a sequence of transfer processes are performed. In each channel, in addition to an address and data which are basic information of data transfer, transfer attribute information is transmitted, which includes MBurstSeq indicating the transfer type, MBurstLength indicating the transfer length, MBurstPrecise indicating transfer preciseness, MAtomicLength indicating atomic transfer, MBlockHight/MBlockStride conveying two-dimensional transfer information, and Msecure conveying security information.

Description will be made below under the assumption that the first bus 100 and the second bus 200 perform communication according to AXI.

Figure 4:
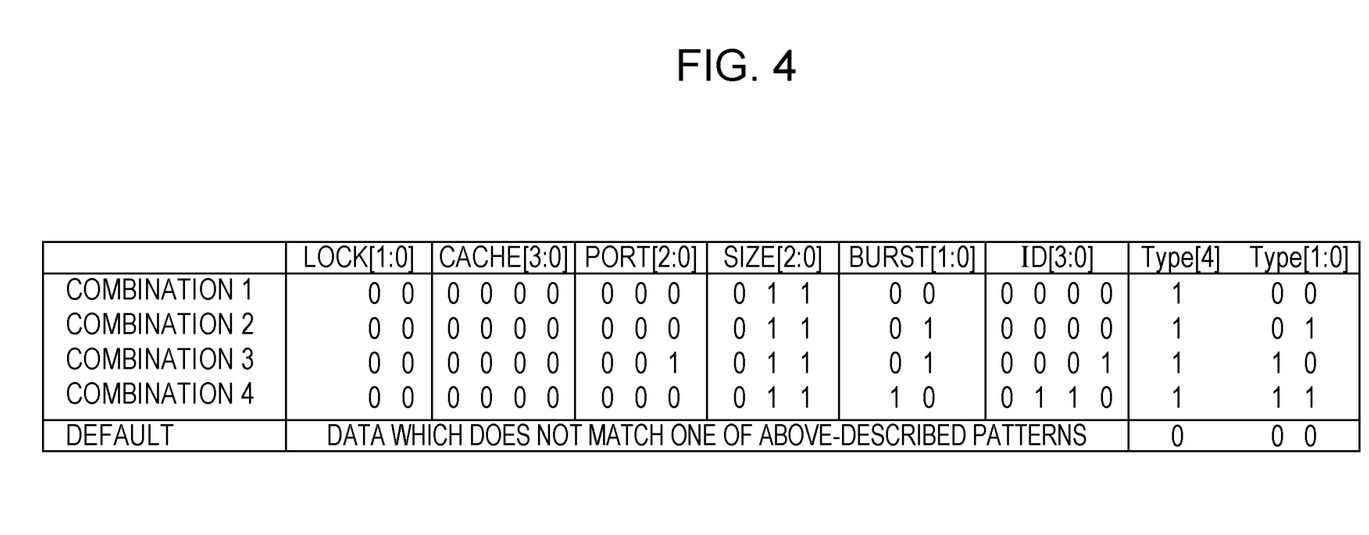
FIG. 4 is a diagram illustrating an exemplary attribute information table.

FIG. 4 illustrates an attribute information table which is stored in an attribute-information combination storing unit. The attribute information table stores pairs of a combination of multiple pieces of attribute information and an identifier to be replaced, which are associated with each other. The attribute information of the first bus (AXI) and the second bus (AXI) includes an exclusive control attribute (LOCK), a cache attribute (CACHE), a security attribute (PORT), a data size (SIZE), a request type (BURST), and a sender (ID).

The exclusive control attribute (LOCK) indicates whether or not transfer is to be performed after a procedure of setting exclusive use for a system bus is performed on the receiving apparatus side. In the exclusive control attribute (LOCK) signal, a "Lock" bit which indicates whether or not transfer is to be performed with the bus being locked, and an "Exclusive" bit which indicates whether or not exclusive transfer is to be performed in order to improve system performance are each represented in one bit.

The cache (CACHE) attribute indicates whether or not the receiving apparatus allows buffering of transfer contents in a path to the transfer destination of data. Four bits are assigned to the cache (CACHE) attribute, and are a bit indicating whether or not a cache operation is available, a bit indicating whether or not buffering is available, and a field (two bits) used to send an instruction, such as WriteThrough or WriteBack, to the cache system itself when a cache miss occurs.

The security attribute indicates whether or not transfer is to be performed after a procedure is performed so that a slave having a high security level is to receive data.

The request type (BURST) indicates the transfer type, and is represented by three pieces of data INCR (continuous address transfer)/FIXED (fixed address)/WRAP (addressing when a cache miss occurs) which are encoded into two bits.

The data size indicates that data transfer is to be performed in a unit indicated by the data size. For example, even when the physical data width is 128 bits, the data size indicates how many bits, for example, 8 bits, 16 bits, . . . , or 128 bits, are used as the data width for transfer.

The pieces of attribute information are orthogonal, and bias occurs in the frequencies of appearance of combinations of values that are used.

In normal data transfer, packets in which a field storing "the exclusive attribute, the cache attribute, and the security attribute information" stores a value indicating being disabled are likely to be more than packets which store a value indicating that such pieces of attribute information are enabled. In addition, a large number of combinations of sender information and data size information which have similar contents are often transmitted intermittently after data transfer is started in a certain transfer. Therefore, before a certain transfer is started, the attribute information table in an attribute-information combination storing unit is rewritten with an attribute information table corresponding to the certain transfer, thereby enabling transfer with various kinds of attribute information to be efficiently performed.

The table in FIG. 4 indicates a table stored in the attribute-information combination storing units 1016, 2017, etc. The table illustrated in FIG. 4 as an example stores four sets of a combination having certain pieces of attribute information, the fifth combination of attribute values as a default used when any one of these four sets is not matched, and identifiers corresponding to these combinations.

Type[4] (second identifier) and [1:0] (first identifier) in the packet identifier indicate identifiers which are added to packets converted by the packet conversion units 1011, 2011, 1014, and 2014. Type[4] indicates the 4th bit in the Type field, and Type[1:0] indicates the 0th to 1st bits in the Type field.

Type[4] in the packet identifier indicates whether or not a combination of pieces of attribute information included in a packet received by a packet conversion unit matches any one of the combinations in the table stored in a corresponding one of the attribute-information combination storing units 1016 and 2017. (In this example, "1" indicates that any one of the combinations is matched, and "0" indicates that no combinations are matched.) Type[1:0] in the packet identifier indicates which combination is matched. If the number of combinations registered in the table is increased, it is necessary to increase the number of bits in this information. As more combinations having a high frequency are registered in the table, the efficiency of compression is higher. In contrast, if too many combinations are registered, efficiency of compression is reduced. It is preferable to replace the attribute information with an identifier having bits, the number of which is smaller than the size of the attribute information.

Figure 5:
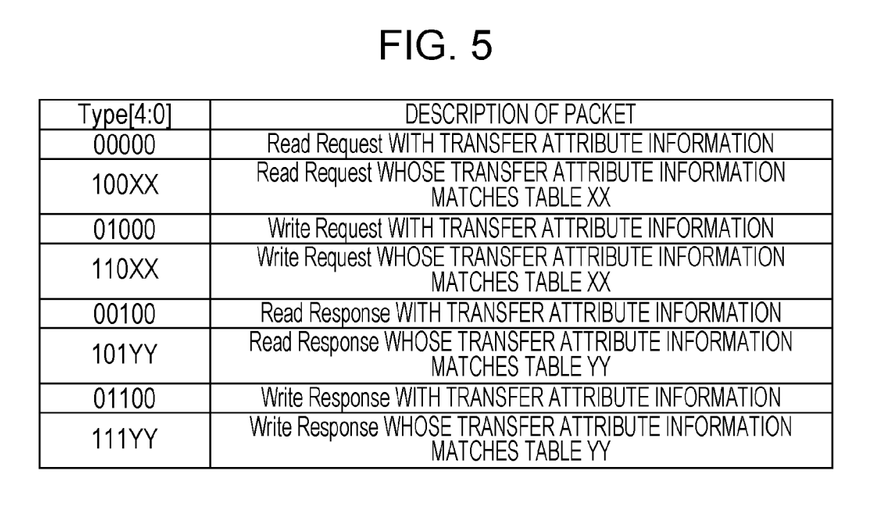
FIG. 5 is a diagram illustrating exemplary packet identifiers.

FIG. 5 illustrates the packet identifier Type[4:0] included in a packet converted using a table in the attribute-information combination storing unit 1016 or 2017. Type[4] and Type[1:0] are described with reference to FIG. 4, and will not be described.

Note that, in the case where Type[4] indicates dissimilarity ("0"), "00" is stored in Type[1:0] for the sake of convenience. Type[3] in the packet identifier indicates whether transfer is read transfer or write transfer ("0" indicates read transfer, and "1" indicates write transfer). Type[2] in the packet identifier indicates whether the transfer direction is the request direction or the response direction ("0" indicates the request direction, and "1" indicates the response direction).

The types of attribute information of a packet in the request path may be different from those in the response path.

The attribute-information combination storing unit 2016 has a table corresponding to that in the attribute-information combination storing unit 1016. The attribute-information combination storing unit 1017 has a table corresponding to that in the attribute-information combination storing unit 2017. A corresponding table indicates a table with which a packet whose attribute information is compressed upstream can be decoded into a packet having the attribute information. It is not necessary to decode a packet into one in the protocol same as that before the compression when the packet is decoded.

In FIG. 5, XX in Type[1:0] indicates the number of the combination of pieces of attribute information in the attribute-information storing unit 1016 for a transmission request and the attribute information storing unit 2016 for a reception request. Similarly, YY in Type[1:0] indicates a combination of pieces of attribute information in the attribute information storing unit 1017 for a transmission response and the attribute information storing unit 2017 for a reception response. To correspond to the bits in FIG. 4, the packet identifier is represented on a 2-bit basis. The packet identifier may have bits, the number of which corresponds to the number of combinations stored in the table.

Figure 6:
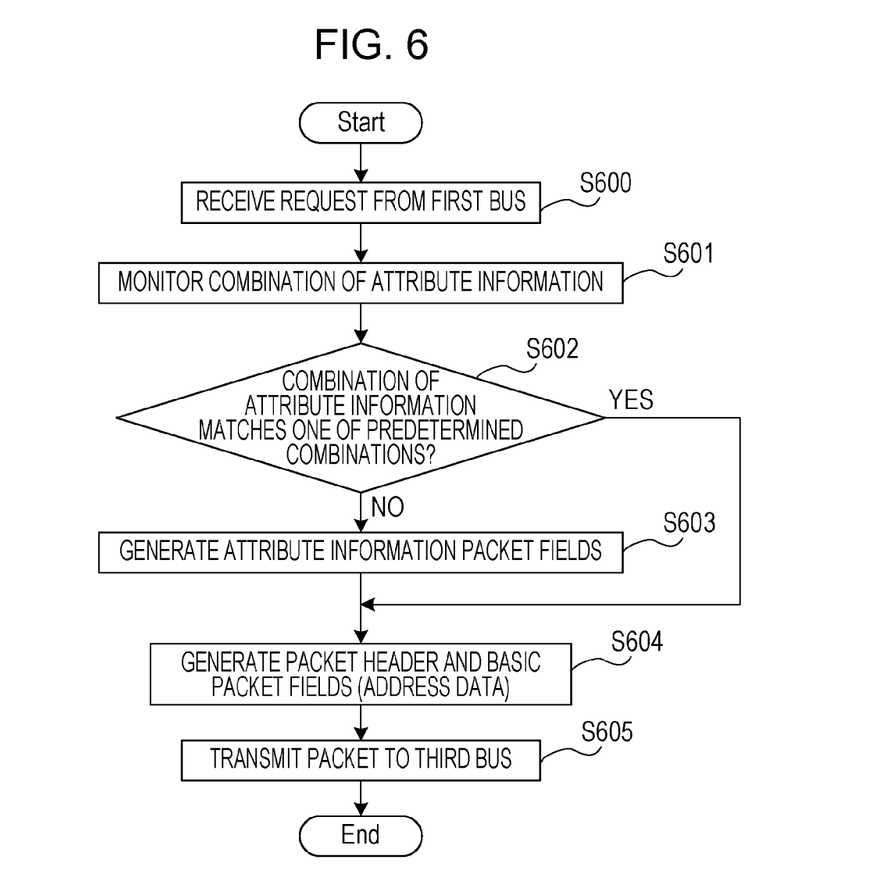
FIG. 6 is a diagram describing a packet transmission process.

The data transfer process which is performed by the data transfer apparatus 101 in FIG. 1 in accordance with the processing flow in FIG. 6 will be described. Preferably, combinations of pieces of attribute information which are found to have a high frequency of appearance are converted into a table in advance, and the table is set in the attribute-information combination storing unit 1016. Alternatively, a learning mechanism may be provided, or the table may be switched in accordance with a mode.

First, the first-bus request reception unit 1010 receives a request transmitted through the first bus 100 (step S600), and the request-packet conversion unit 1011 checks the attribute information of the request (step S601).

The request-packet conversion unit 1011 transmits an inquiry to the attribute-information combination storing unit 1016 in order to compare the attribute information included in the request from the first bus 100 with the attribute information stored in the attribute-information combination storing unit 1016 (step S602).

The request-packet conversion unit 1011 compares the packet received from the first-bus request reception unit 1010 with the value of the attribute information obtained from the attribute information storing unit 1016, and adds a packet identifier according to the comparison result to the header. If the packet has a combination of pieces of attribute information which is registered in the table in the attribute-information combination storing unit 1016, the packet identifier is added to the converted packet, and the attribute information is not embedded in the converted packet instead (the process proceeds to step S604).

If the combination of the pieces of attribute information of the packet received by the request-packet conversion unit 1011 does not match any one of the combinations of pieces of attribute information stored in the table in the attribute-information combination storing unit 1016, a predetermined packet identifier ("00000" or "01000" in FIG. 5) is added. The attribute information included in the packet is embedded in the format illustrated in FIG. 8A and the packet is transferred (steps S603 and S604).

The request-packet transmission unit 1012 transmits the packet generated in the request-packet conversion unit 1011, to the third bus 300 (step S605).

FIG. 8A illustrates the format of a packet which is output by a packet conversion unit when the combination of the pieces of attribute information of a packet received by the packet conversion unit does not match any one of the combinations of pieces of attribute information which are registered in the table in the attribute-information combination storing unit. FIG. 8B illustrates the format of a packet which is output by a packet conversion unit when the combination of the pieces of attribute information of a packet received by the packet conversion unit matches one of the combinations of pieces of attribute information which are registered in the table in the attribute-information combination storing unit.

Referring to FIG. 8B, when the combination of the pieces of attribute information of a packet received by a packet conversion unit matches one of the combinations of pieces of attribute information which are registered in the table in the attribute-information combination storing unit, it should be understood that the total volume of data transferred through the third bus is compressed. For example, in the current AXI protocol, transfer at burst length of 16 (AXI3) or burst length of 256 (AXI4) is possible. Actually, as a longer transfer length is allowed, the possibility that an influence is exerted on other transfers is increased. Therefore, the burst length of 4 or 8 is often set to the maximum for the sake of convenience. Accordingly, when attribute information is not compressed, attribute information often appears every four or eight bursts, resulting in a high necessity to compress the attribute information.

Figure 7:
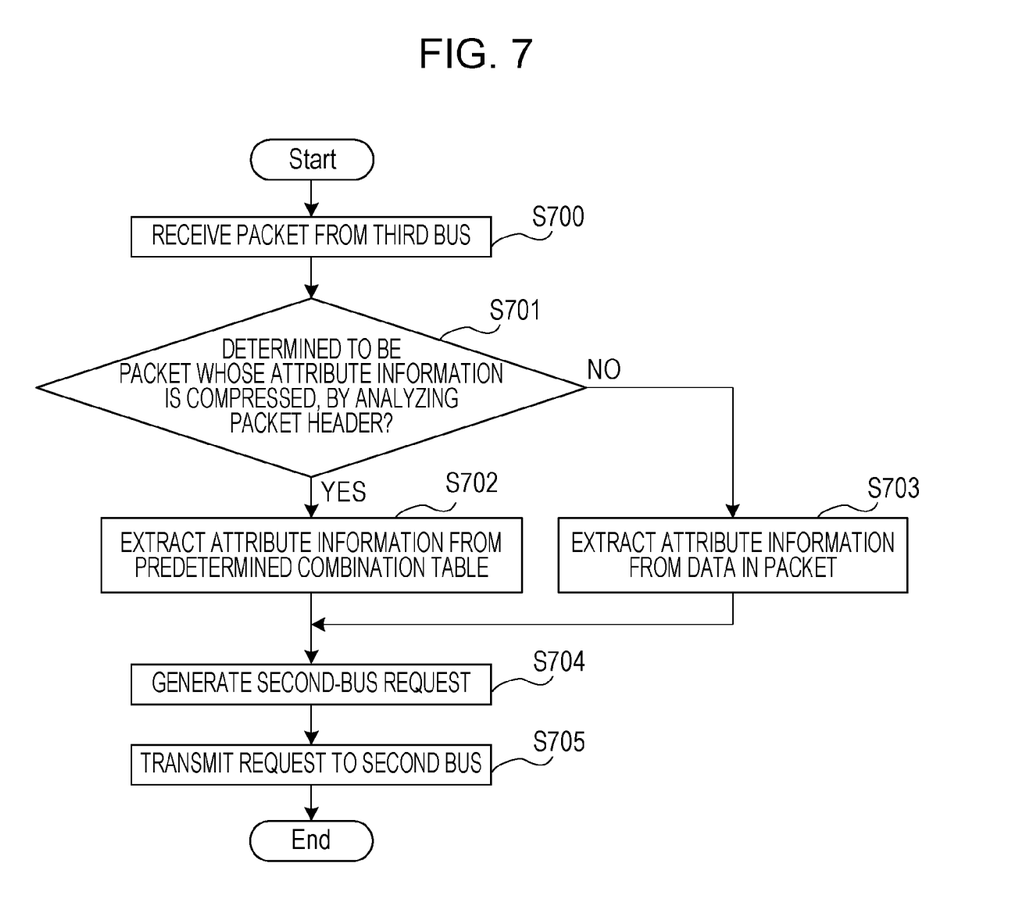
FIG. 7 is a diagram describing a packet reception process.

The data transfer process which is performed by the data receiving apparatus 201 in FIG. 1 in accordance with the processing flow in FIG. 7 will be described. Combinations of pieces of attribute information having a high frequency of appearance are converted into a table in advance, and the table is set in the attribute-information combination storing unit 2016.

First, the request-packet reception unit 2010 receives a packet transmitted through the third bus 300 (step S700), and the request-packet conversion unit 2011 analyzes the identifier of the packet received by the request-packet reception unit 2010 (step S701).

If the analysis indicates that the received packet is converted by the request-packet conversion unit 1011 as a packet having the attribute information in a combination registered in the table, reference is made to the values of the attribute information registered in the table in the attribute-information combination storing unit 2016, and attribute information for the second bus 200 which corresponds to the attribute information before the compression is generated (step S702).

The indication that the attribute information of a packet is replaced with the identifier by the request-packet conversion unit 1011 corresponds to the indication that the identifier of the packet indicates that the request-packet conversion unit 2011 is to refer to the attribute-information combination storing unit 2016.

If the received packet indicates that the packet is converted by the request-packet conversion unit 1011 as a packet which does not have attribute information in the combinations registered as the attribute information storing values, the attribute information embedded in the received packet is used (step S703). In this case, the request-packet conversion unit 2011 need not refer to the attribute information in the attribute-information combination storing unit 2016.

A request for the second bus 200 is generated from the packet received by the request-packet conversion unit 2011 (step S704), and the second-bus request transmission unit 2012 then issues the request to the second bus 200 (step S705).

As described above, according to the present embodiment, data transfer can be performed with the attribute information of a packet to be transferred being compressed as appropriate. This enables the data transfer through the third buses 300 and 301 to be performed efficiently.

In the above-described embodiment, a third bus through which transfer using a packet is performed (parallel transfer of data having a packet width, such as Network On Chip) is described. The present invention may be applied to various types of physical transfer, such as a serial bus and wireless communication. That is, a high effect is exerted on data transfer in which data is packetized in logical layers, and any configuration of physical layers is employable.

In the above-described embodiment, data transfer between integrated circuits (between chips, between modules) is described. The present invention may be applied to data transfer in a single integrated circuit (single chip, single module).

Transfer between chips has data transfer ability lower than that in transfer in a chip, resulting in high possibility of a system bottleneck. In transfer in a chip, physical signal lines are present for respective purposes of "attribute information", "address", and "data", and pieces of data can be transferred simultaneously and in parallel. In contrast, in transfer between chips, reduction in cost of products leads to sharing of a common signal line (because more IO pins in a chip increase the cost), resulting in data transfer in time sequence. Therefore, using the above-described embodiment, efficiency of transfer between chips is markedly improved in comparison with the case of transfer in a chip.

In the above-described embodiment, an attribute information table is set in an attribute-information combination storing unit before data transfer. The attribute information may be statically set at the time of design development (or at the time of manufacturing).

In the case where it is found in advance that a high-order or low-order part of an address is constant, a configuration may be employed in which the attribute information table includes the high-order (or low-order) address information, and in which attribute information and the constant part of an address (high-order or low-order bits) are compressed together. For example, in consideration of characteristics of an address map in software and the specification of a bus, it is likely that the high-order four bits are constantly fixed to "0000" when a certain module is accessed. In this case, the high-order address comparison value is set in the table, whereby the constant bits of an address cause efficiency of the data transfer to be further improved (the same applies to a low-order address). In this case, when the constant address part is replaced with an identifier, the replacement may be performed after it is checked that one of the combinations including only attribute information is matched.

In the above-described embodiment, when a combination of pieces of attribute information does not match any one of the combinations stored in a table, only an identifier which indicates that the combination does not match any one in the table is added. A configuration may be employed in which the constant address part is replaced even when the combination of attribute information does not match any one in the table. In this case, the decoding side needs to have a configuration in which the constant address part is always added.

In the above-described embodiment, description is made taking AXI as a protocol used for the first bus 100 and the second bus 200 in FIG. 1, and the buses 909 and 910 in FIG. 9. The present invention may use any protocol in which a combination of data, an address, and attribute information is transferred, so as to achieve a wide effect. The present invention may be applied even to the case where multiple transfer contents are represented as a single piece of attribute information in multiple bits.

Depending on usage of a sender, such as a CPU or a DMA which performs data transfer, bias occurs in frequencies of appearance of combinations of attribute information. Therefore, an attribute-information combination storing unit may store tables for respective senders. In addition, when the order of the frequency of appearance of attribute information is changed at predetermined timing, the CPU 901 may update the table in an attribute-information combination storing unit. At that time, the combinations having a high frequency of appearance are prioritized and stored.

According to the present invention, data transfer efficiency can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2011/079499, filed Dec. 20, 2011, which is hereby incorporated by reference herein in its entirety.

The invention claimed is:

1. A data transfer apparatus that performs data transfer using a packet having a header field and a data field including data, the header field including a plurality of pieces of attribute information that indicate types of the data transfer, the apparatus comprising:
   storing means for prioritizing and storing a combination of attribute information having a high frequency of appearance in a first bus wherein the combination of attribute information and an identifier are associated with each other, and the combination of the attribute information is a combination of at least two of a request type, cache information, security information, data width information, and exclusive access information;
   receiving means for receiving a packet including a plurality of pieces of attribute information from the first bus; and
   transmitting means for, in the case where the plurality of pieces combination of attribute information included in the packet received by the receiving means match a certain combination of attribute information stored in the storing means, transmitting a packet including the identifier corresponding to the certain combination of attribute information instead of the plurality of pieces of attribute information.

2. The data transfer apparatus according to claim 1, wherein, in the case where a combination of the plurality of pieces of attribute information included in the packet obtained from the first bus matches a combination stored in the storing means, the transmitting means does not transmit the matched combination of attribute information and transmits a packet including an identifier that indicates that a matched combination is present.

3. The data transfer apparatus according to claim 1, wherein, in the case where a combination of the plurality of pieces of attribute information included in the packet obtained from the first bus does not match a combination stored in the storing means, the transmitting means transmits a packet including a packet identifier and the attribute information received from the first bus, the packet identifier indicating that no matched combinations are present.

4. The data transfer apparatus according to claim 1, wherein the storing means stores a constant part of an address which is associated with the identifier, in addition to the combination of attribute information, and, in the case where the plurality of pieces of attribute information received by the receiving means match a certain combination of attribute information stored in the storing means, the transmitting means transmits a packet obtained by using an identifier corresponding to the certain combination of attribute information, as a substitute for the plurality of pieces of attribute information and for the constant part of the address received by the receiving means and by combining the rest in the address, the data, and the identifier.

5. The data transfer apparatus according to claim 1, wherein the combination of the attribute information is a combination of at least two of request type, cache information, security information, data width information, and exclusive access information, BlockHight/MBlockStride conveying two-dimensional transfer information and xQOS signal indicating transfer priority.

6. A data transfer apparatus that performs data transfer using a packet having a header field and a data field including data, the header field including a plurality of pieces of attribute information that indicate types of the data transfer, the apparatus comprising:
storing means for prioritizing and storing a combination of attribute information, having a high frequency of appearance in a first bus wherein the combination of attribute information and an identifier are associated with each other, and the combination of the attribute information is a combination of at least two of a request type, cache information, security information, data width information, and exclusive access information;
receiving means for receiving a packet including the identifier; and
transmitting means for, in the case where the identifier of the packet received by the receiving means indicates that the storing means is to be referred to, transmitting the attribute information of a certain combination and the data received by the receiving means as a packet, the certain combination corresponding to the identifier included in the packet and being among the combinations of attribute information stored in the storing means.

7. The data transfer apparatus according to claim 6, wherein, in the case where the identifier of the packet received by the receiving means indicates that the storing means is not to be referred to, the transmitting means transmits the attribute information included in the packet received by the receiving means and the data received by the receiving means, the attribute information being added to the data.

8. A data transfer apparatus comprising:
first storing means for prioritizing and storing a combination of attribute information, indicating a type of data transfer, having a high frequency of appearance in a first bus, wherein the combination of attribute information and a first identifier are associated with each other, the combination of the attribute information is a combination of at least two of a request type, cache information, security information, data width information, and exclusive access information, and the first identifier has bits, the number of which is smaller than the size of the attribute information
first receiving means for receiving data to be transferred and attribute information about the data; and
first transmitting means for transmitting the first identifier instead of the attribute information, the first identifier corresponding to the attribute information received by the first receiving means, being among the first identifiers stored in the first storing means, and being associated with the data to be transferred.

9. The data transfer apparatus according to claim 8, wherein the first transmitting means transmits a second identifier indicating whether or not the first identifier corresponding to attribute information stored in the first storing means is added, and the data to be transferred, the second identifier and the data being associated with each other.

10. A data transfer apparatus comprising:
second storing means for prioritizing and storing a combination of attribute information, indicating a type of data transfer, having a high frequency of appearance in a first bus, wherein the combination of attribute information and a first identifier are associated with each other, the combination of the attribute information is a combination of at least two of a request type, cache information, security information, data width information and exclusive access information, and the first identifier has bits, the number of which is smaller than the size of the attribute information;
second receiving means for receiving data that is associated with the first identifier; and
second transmitting means for transmitting attribute information that corresponds to the first identifier and that is obtained from the second storing means, and the data, the attribute information and the data being associated with each other.

11. An inter-chip communication system comprising:
a first integrated circuit connected to a first bus;
a second integrated circuit connected to a second bus; and
a third bus connecting the first integrated circuit to the second integrated circuit,
wherein the first integrated circuit includes first receiving means for receiving, via the first bus, a data transfer request including attribute information, data, and an address, and first transmitting means for, in the case where the received attribute information matches a combination of attribute information stored in the first integrated circuit, transmitting an identifier that corresponds to the combination of attribute information and that is added to the address instead of the combination of attribute information, together with the data as a packet via the third bus to the second integrated circuit, wherein the first integrated circuit stores a combination of attribute information that appears at high frequency in some packets, and the combination of the attribute information, security information, data width information, and exclusive access information, and
wherein the second integrated circuit includes second receiving means for receiving a packet transferred from the first integrated circuit via the third bus, and second transmitting means for, in the case where the identifier in the received packet indicates that a combination of attribute information stored in the second integrated circuit is to be referred to, transmitting the combination of attribute information corresponding to the identifier to the second bus by combining the identifier with the data included in the packet.

12. The inter-chip communication system according to claim 11,
wherein the identifier has bits, the number of which is smaller than the size of the attribute information.

13. A data transfer method performed by a data transfer apparatus that includes storing means for prioritizing and storing a combination of attribute information having a high frequency of appearance in a first bus wherein the combination of attribute information is a combination of at least two of a request type, cache information, security information, data width information, and exclusive access information and an identifier, the combination of attribute information and the identifier being associated with each other, and that performs data transfer using a packet having a header field and a data field including data, the header field including a plurality of pieces of attribute information that indicate types of the data transfer, the method comprising the steps of;

receiving a packet including the plurality of pieces of attribute information from the first bus; and in the case where the plurality of pieces of attribute information included in the packet received by the receiving step match the certain combination of attribute information stored in the storing means, transmitting a packet including the identifier corresponding to the certain combination of attribute information instead of the plurality of pieces of attribute information.

14. A data transfer method performed by a data transfer apparatus that includes storing means for prioritizing and storing a combination of attribute information having a high frequency of appearance in a first bus wherein the combination of attribute information and the identifier being associated with each other, the combination of the attribute information is a combination of at least two of a request type, cache information, security information, data width information, and exclusive access information, and that performs data transfer using a packet having a header field including a plurality of pieces of attribute information and a data field including data, the method comprising the steps of;

receiving a packet including the plurality of pieces of attribute information from the first bus; and in the case where the plurality of pieces of attribute information included in the packet received by the receiving step match the certain combination of attribute information stored in the storing means, transmitting a packet including the identifier corresponding to the certain combination of attribute information instead of the plurality of pieces of attribute information.

15. A data transfer method performed by a data transfer apparatus including first storing means for prioritizing and storing a combination of attribute information, indicating a type of data transfer, having a high frequency of appearance in a first bus, wherein the combination of attribute information and a first identifier are associated with each other, the combination of the attribute information is a combination of at least two of a request type, cache information, security information, data width information and exclusive access information and the first identifier has bits, the number of which is smaller than the size of the combination of the attribute information, the method comprising the steps of: performing a first reception process of receiving data to be transferred and a plurality of pieces of attribute information about the data; and performing a first transmission process of transmitting the first identifier instead of the attribute information, the first identifier corresponding to the attribute information received in the first reception process, being among the first identifiers stored in the first storing means, and being associated with the data to be transferred.

16. A data transfer method performed by a data transfer apparatus including second storing means for prioritizing and storing a combination of attribute information, indicating a type of data transfer, having a high frequency of appearance in a first bus, wherein the combination of attribute information and a first identifier are associated with each other, the combination of the attribute information is a combination of at least two of a request type, cache information, security information, data width information, and exclusive access information and the first identifier has bits, the number of which is smaller than the size of the combination of the attribute information, the method comprising the steps of: performing a second reception process of receiving data that is associated with the first identifier; and performing a second transmission process of transmitting the combination of attribute information that corresponds to the first identifier and that is obtained from the second storing means, and the data, the attribute information and the data being associated with each other.

* * * * *